United States Patent Office

2,771,421
Patented Nov. 20, 1956

2,771,421
OIL WELL DRILLING FLUIDS

William C. Browning, Schofield, Wis., assignor to Marathon Corporation, Rothschild, Wis., a corporation of Wisconsin No Drawing. Application November 12, 1954,
Serial No. 468,587

3 Claims. (Cl. 252—8.5)

This invention relates to aqueous drilling fluids for use in rotary drilling of oil and gas wells. More specifically, the invention relates to new and novel lignosulfonate compounds that may be used to control the viscosity, thixotropic characteristics, and fluid-loss properties of drilling muds and maintaining these properties under the temperature conditions associated with deep drilling as well as the presence of the usual contaminants encountered in the drilling operations.

Lignosulfonate salts of the alkali metals and alkaline earth metals have been previously found useful for dispersing lime base drilling muds and to stabilize oil-in-water emulsions in emulsion-type drilling fluids as disclosed in U. S. Patent 2,491,436 and U. S. Patent 2,476,845. The lignosulfonates of the alkali metals or alkaline earth metals will not act to improve the characteristics of drilling muds when used by themselves or in conjunction with sodium hydroxide. In fact, they act to impair a bentonitic drilling mud by increasing viscosity, gels, and water-loss characteristics. The concomitant addition of an alkaline earth hydroxide, such as calcium hydrate, was found necessary to convert the usual sodium bentonite to a calcium bentonite as described in U. S. Patent 2,491,436.

Such lime treated muds as described in U. S. Patent 2,491,436 have many advantages. They effectively reduce the viscosity and gels of bentonitic drilling muds; they are exceptionally resistant to the effect of contaminants, such as calcium sulfate, sodium chloride, cement, and to the effect of temperatures encountered in wells up to 10,000 feet deep or 240° F. Lime treated muds also have low mud-making properties and thus are very satisfactory for drilling through the so-called heaving shales because bentonite does not swell in the lime base fluid media as it does in high caustic or other sodium base fluid media.

Despite the many advantages of the use of lignosulfonates as dispersing agents in lime base drilling muds, an increasing number of problems associated with the high temperatures of deep wells has occurred in recent years. The main difficulty has been due to a "setting-up" of the mud in holes deeper than 10,000 feet where temperatures exceed 240° F. This phenomenon has been termed "high temperature solidification" and may result in failure of logging tools to reach the bottom of the hole, excessive pressures to start circulation, or inability to pull packers after a production test. Chemical and X-ray analysis support the theory that solidification is brought about by the interaction of caustic soda and lime with the clay minerals present in the mud. Apparently the lime reacts with the clay to form hydrated calcium silicates and the alkali acts to decompose the clay to form soluble aluminates and silicates and all combine to form a cement-like material.

The present invention provides an improved lignosulfonate compound for the conditioning of drilling mud which overcomes the aforementioned difficulties. This new compound does not require the concomitant use of alkaline earth metal hydroxide to condition a drilling fluid. This lignosulfonate does not require a high alkali content as does conventional organic mud-treating chemicals. Its optimum action takes place in the pH range between 6.5 and 8.5. Inasmuch as this new lignosulfonate compound does not require lime hydrate or high pH caustic treatment to be made effective, muds so treated cannot suffer the detrimental effects common to lime or high pH caustic muds.

Conventional organic mud thinning chemicals generally operate in the pH range of from 9 to 12 and hence are subject to the deleterious effect of sodium hydroxide upon the clay minerals when subjected to temperatures above 250° F. In addition, the high pH sodium tannate solutions convert the native colloid clays of the formations being penetrated into hydrated sodium clays and consequently such clays become part of the mud. This, of course, means that the muds solids increase with a consequent rise in drilling mud viscosity and gels. In some areas the "mud-making" propensity of the formation clays becomes a serious problem. I have found that solutions of the compounds made according to this invention have extremely low hydration value for bentonite and consequently has the desirable low mud-making properties of an inert drilling fluid. Such a fluid is also very desirable to combat heaving shales. Drilling muds prepared in accordance with this invention are resistant to the effects of electrolyte contamination and to the contaminating effects of cement. Such drilling muds overcome many of the difficulties previously discussed.

The compounds, which are the subject of this invention, are not a simple double-decomposition product giving an aluminum salt of lignosulfonic acid such as would be prepared according to the Howard Patent Re. 18,268. Indeed, such an aluminum lignosulfonate will not by itself operate in a manner superior to ordinary calcium lignosulfonate. The specific aluminum lignosulfonate complexes used according to this invention contain an appreciable quantity of aluminum in anionic form as an aluminum lignosulfonate complex, as well as aluminum in cationic form. They are most effective when added in suitable amounts to drilling muds in which the pH is adjusted from 6.5 to 8.5 by addition for example of caustic soda. Such drilling muds are stable and resistant to temperatures as high as 350° F. in use.

The following is an illustrative procedure in making a suitable aluminum lignosulfonate complex. I use as a starting material calcium lignosulfonate contained in spent sulfite liquors resulting from the manufacture of paper pulp by the conventional sulfite process. The calcium lignosulfonate may be obtained from such liquors by precipitation with lime as disclosed in Howard Reissue Patent 18,268 or from the spent sulfite liquors after removing sugars by fermentation to produce alcohol or yeast.

As an example of a typical manufacturing process, the calcium-lignosulfonate produced in accordance with Reissue Patent 18,268 of approximately 32% solids and 15% CaO is treated with aluminum sulfate. The aluminum sulfate is added in sufficient quantity so that the sulfate is equivalent to the lime present in the organic precipitate of purified calcium lignosulfonate. The aluminum sulfate is added simultaneously with the purified lignosulfonate to a reaction vessel at a temperature of about 80° C. When all of the purified calcium lignosulfonate and aluminum sulfate have been added, oxalic acid equivalent to 11% on the weight of the lignin present is added. The reaction mixture is agitated for at least 15 minutes after all of the oxalic acid has been added and then the calcium sulfate removed from the fluid mixture by filtration. The filtrate is evaporated to approximately 35% by weight solids and then dried by a conventional dryer, either vacuum or spray drying. Products may be prepared with the aluminum sulfate content varying to account for from 100 to 75% by weight of the lime present in the basic lignosulfonate. The remaining lime is removed by treatment with sulfuric acid prior to the addition of the oxalic acid. The oxalic acid content of the complex salts may be varied between 7% oxalic on the weight of the lignin to 15% oxalic acid on the weight of the lignin. Oxalic acid or the oxalates are only one of a number of organic complexing salts, the series of which includes acetates, formates, lactates and tartrates. The oxalates however are preferred.

It may be postulated that the specific dispersing action of this new compound in bentonitic clays resides in the specific nature of the aluminum ion which will replace calcium in the exchange positions in the clay mineral latice. Cationic aluminum is highly absorbed by the clay mineral and so bonds the associated sulfonate compound which provides the necessary electrokinetic potential to achieve dispersion. In addition it may be postulated that a clogging of the other available exchange sites are affected by the anionic aluminum complex, thus stabilizing the clay to counteract other ions found in normal drilling operations. Furthermore, since the pH of the mud so treated is not high, alkaline desulfonation of the lignosulfonate at elevated temperatures is minimized and the complex aluminum lignosulfonate itself is more stable to the effect of the temperature conditions encountered in deep hole drilling than is ordinary calcium lignosulfonate under the high pH conditions normal to lime base drilling fluids. The complex thus described when used as a treating chemical for conditioning drilling fluids gives a mud of superior resistance to high temperatures. Muds or clays treated with the complex aluminum lignosulfonate because of the low pH required are not susceptible to the deleterious effects of high caustic concentration. A mud so treated has a high resistivity that facilitates electric logging. The fluid formed is essentially inert to clays, that is, it has little or no power to cause the swelling of bentonite. Thus, it performs admirably in regions where heaving slade is encountered. A drilling fluid so conditioned is resistant to the action of anhydride, sodium chloride, and cement. The complex aluminum lignosulfonate muds emulsify oils in a manner similar to that achieved with all other lignosulfonates. The muds may be treated with starches or carboxymethyl cellulose to further reduce water loss, although these muds normally have a lower water loss than that encountered with the usual lime base fluid.

The particular advantages obtained with the aluminum lignosulfonate complex are illustrated in the following examples. The physical properties of the various muds were determined according to the standard procedures (API Code 29). Generally speaking, viscosity values should not exceed 40 cp., initial gels should not exceed 5 g., 10 minute gels not exceed 50 g., and water loss values not exceed 10 cc.

EXAMPLE 1

The following tests illustrate the thinning action of my aluminum lignosulfonate complex upon a bentonitic drilling mud of 35% clay solids as compared with conventional thinning agents, i. e., lignite and phosphate. The mixtures were stirred for 30 minutes and the indicated test run with the following results:

*Table I*

| Treatment Chemicals | Amount, Lb./Bbl. | Viscosity, Cps. | Gel, g. Initial | Gel, g. 10 Min. | 30 Min. Water Loss, cc. | pH |
|---|---|---|---|---|---|---|
| No treatment | | | (¹) | (¹) | (¹) | (¹) |
| Lignite | 5 | | (¹) | (¹) | (¹) | (¹) |
| NaOH | 1.5 | | | | | |
| Lignite | 7 | | (¹) | (¹) | (¹) | (¹) |
| NaOH | 2 | | | | | |
| Lignite | 10 | | (¹) | (¹) | (¹) | (¹) |
| NaOH | 2 | | | | | |
| Commercial complex phosphate mud-treating agent | 0.5 | 38 | 0 | 40 | 7.1 | 7.1 |
| Do | 1.0 | 38 | 0 | 55 | | 7.0 |
| Aluminum lignosulfonate complex | 9 | 17 | 0 | 0 | 5.3 | 7.2 |
| NaOH | 1 | | | | | |

¹ All too thick to measure.

EXAMPLE 2

A comparison of the effectiveness of my complex aluminum lignosulfonate compound with a conventional lime base mud thinned with an alkaline earth metal lignosulfonate as treating agents on a fully hydrated 12% bentonite suspension is given below in Table II.

*Table II*

| Treatment | Amount, Lb./Bbl. | Viscosity, Cps. | Gel, g. Initial | Gel, g. 10 Min. | 30 Min. Water Loss, cc. | pH |
|---|---|---|---|---|---|---|
| No treatment | | 69 | 10 | 70 | 8.8 | 8.8 |
| Calcium lignosulfonate | 8 | 24 | 0 | 10 | 6.8 | 12.7 |
| Lime hydrate | 6 | | | | | |
| Sodium hydroxide | 0.5 | | | | | |
| Aluminum lignosulfonate complex | 10 | 19 | 0 | 0 | 6.4 | 7.1 |
| Sodium hydroxide | 0.5 | | | | | |

EXAMPLE 3

The stability of aluminum lignosulfonate complex treated muds to deep hole drilling temperature conditions are illustrated in the following tables. Table III shows the results obtained with a 6% bentonite suspension and Table IV with a 35% bentonitic drilling mud having an original fluid loss of 34 cc. (30/100).

Table III

| Treatment (conventional low lime treatment for maximum heat stability) | Amount, lbs./Bbl. | Properties after 24 hours at 350° F. | | | | |
|---|---|---|---|---|---|---|
| | | Viscosity, cps. | 0 Gel | 10' Gel | 30' Water Loss, cc. | pH |
| Calcium lignosulfonate | 2 | 27 | 0 | 95 | 27.4 | 10.2 |
| Lime hydrate | 2 | | | | | |
| NaOH | 0.5 | | | | | |
| Aluminum lignosulfonate complex | 10 | 20 | 0 | 20 | 13.8 | 6.8 |
| NaOH | 1 | | | | | |

Table IV

[Base fluid: Fully hydrated bentonitic mud of 35% solids]

| Treatment | Amount Lbs./Bbl. | Properties after 24 hrs @ 302° F. | | | | |
|---|---|---|---|---|---|---|
| | | Viscosity, cps. | 0 Gel | 10' Gel | 30' Water Loss cc. | pH |
| Calcium lignosulfonate | 8 | (¹) | (¹) | (¹) | (¹) | (¹) |
| Lime hydrate | 6 | | | | | |
| NaOH | 1 | | | | | |
| Diesel Oil | 60 | | | | | |
| Aluminum lignosulfonate complex | 10 | 36 | 0 | 8 | 10.6 | 5.4 |
| NaOH | 1 | | | | | |
| Diesel Oil | 60 | | | | | |

¹ Plastic too thick to measure.

EXAMPLE 4

The compatability of the aluminum lignosulfonate complex with prepasted starch is illustrated in Table V with data for a 6% bentonite suspension given:

Table V

Treatment—lbs./bbl.:
5 lbs. aluminum lignosulfonate complex.
5.0 lbs. prepasted starch.
0.5 lb. NaOH.

| | 30 Minutes | 18 hrs. at 122° F. | 24 hrs. at 350° F. |
|---|---|---|---|
| Viscosity, cps. | 18.5 | 13 | 11.5 |
| 0 gel, grams | 0 | 0 | 0 |
| 10' gel, grams | 0 | 0 | 7 |
| 30' Water loss, cc. | 5.9 | 5.2 | 17 |
| pH | 7.4 | 7.4 | 4.6 |

EXAMPLE 5

The effect of aluminum lignosulfonate complex treatment on combination of starch and diesel oil emulsion in a 0.7% bentonite suspension is illustrated in Table VI as follows:

Table VI 5 lbs. aluminum lignosulfonate complex.
0.5 lb. NaOH.
10 lbs. starch.
60 lbs. diesel oil.

| | 30 Minutes | 16 hrs. at 302° F. |
|---|---|---|
| Viscosity, cps. | 17.5 | 6.5 |
| 0 gel, grams | 0 | 0 |
| 10' gel, grams | 0 | 0 |
| 30' water loss, cc. | 2.0 | 2.7 |
| pH | 8.7 | 5.9 |

EXAMPLE 6

The resistance of a 35% bentonitic mud treated with aluminum lignosulfonate complex to the effect of contamination by cement is given in Table VII.

Table VII

Treatment—lbs./bbl. of mud:
10 lbs. aluminum lignosulfonate complex.
1 lb. NaOH.

| Properties | Uncontaminated | Contaminated: 15 hrs. at room temperature plus 20 lbs. hydrated cement |
|---|---|---|
| Viscosity, cps. | 16.5 | 27 |
| 0 gel, grams | 0 | 0 |
| 10' gel, grams | 0 | 0 |
| 30' water loss, cc. | 5.4 | 11.4 |
| pH | 7.2 | 11.7 |

The amounts of the aluminum lignosulfonate complex added to the drilling fluids may vary greatly depending upon the specific conditions which exist. In general, the complex may be added in amounts ranging from about 0.1% to 5.0% by weight of the drilling fluid.

EXAMPLE 7

Under certain drilling conditions it may be decided to convert the mud system to a lime treated mud as when severe anhydrite or cement contamination is encountered. This may be readily accomplished as indicated in Table VIII wherein the data for 35% bentonite mud is given.

Table VIII

| | Treatment—lbs./bbl. of mud | |
|---|---|---|
| | 10 lbs. Aluminum Lignosulfonate Complex plus | |
| | 1 lb. NaOH | 6 lbs. Lime, 0.5 lb. NaOH |
| Viscosity, cps. | 16.5 | 16.5 |
| 0 gel, grams | 0 | 0 |
| 10' gel, grams | 7 | 0 |
| 30' Water loss, cc. | 12.8 | 16.2 |
| pH | 7.3 | 12.5 |

It is to be understood that changes and modifications may be made in regard to specific details of the invention herein described which are intended to be included within the scope of the appended claims.

I claim:

1. A drilling fluid comprising bentonitic clay and an agent for controlling the viscosity and gel characteristics of the drilling fluid, said agent being an aluminum lignosulfonate complex wherein the aluminum is present in anionic and cationic form, said agent being made by treating basic calcium lignosulfonate with aluminum sulfate, then with a solution of an organic acid selected from the group consisting of oxalic, acetic, formic, lactic and tartaric acid having the property of replacing lignosulfonate in the aluminum complex, filtering said reaction mixture and drying the filtrate.

2. A drilling fluid as defined in claim 1 having a pH of about 6 to about 8.5.

3. A drilling fluid as defined in claim 1 wherein the agent is present in amounts of about 0.1% to about 5.0% by weight of the drilling fluid.

References Cited in the file of this patent

UNITED STATES PATENTS

| | | |
|---|---|---|
| 2,476,845 | Dawson | July 19, 1949 |
| 2,491,436 | Barnes | Dec. 13, 1949 |
| 2,491,437 | Perkins | Dec. 13, 1949 |